A. DIEMER.
APPARATUS FOR AUTOMATICALLY ADJUSTING THE SPARKING PERIOD OF IGNITION SYSTEMS.
APPLICATION FILED MAR. 10, 1913.
1,105,628.
Patented Aug. 4, 1914.
2 SHEETS—SHEET 1.
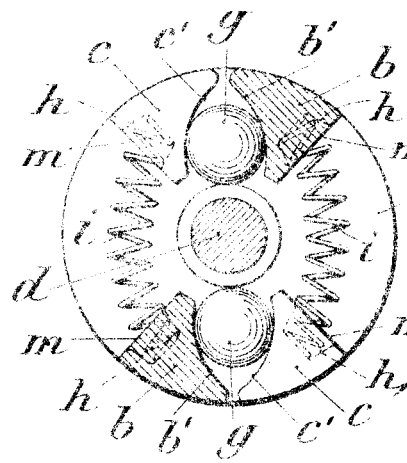
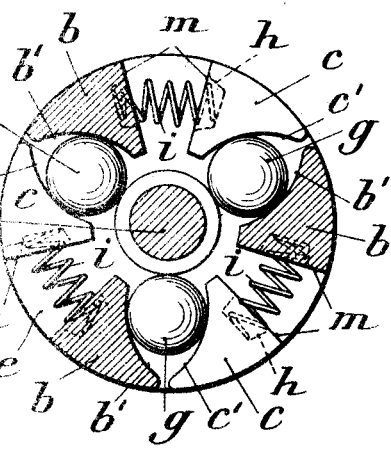
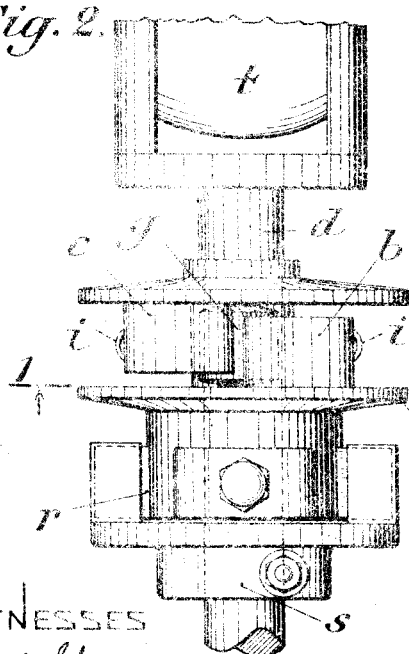
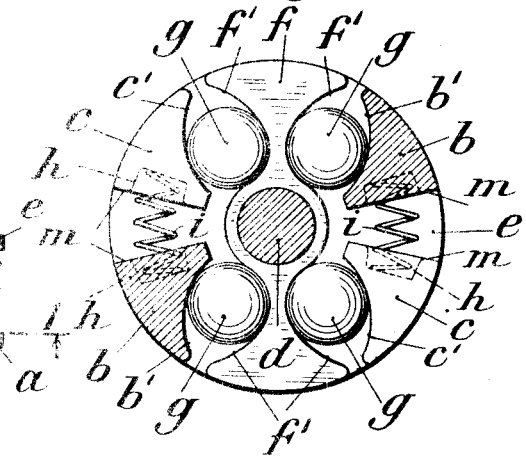
WITNESSES
INVENTOR
Anton Diemer

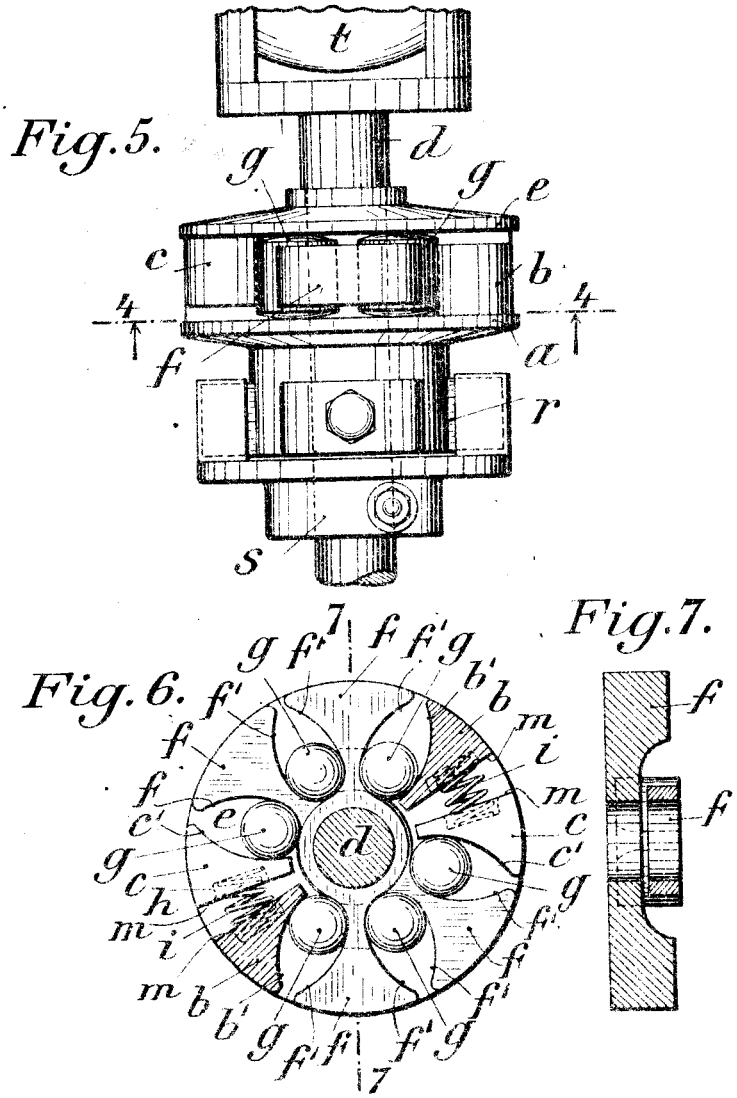

UNITED STATES PATENT OFFICE.

ANTON DIEMER, OF STUTTGART, GERMANY, ASSIGNOR TO THE FIRM OF ROBERT BOSCH, OF STUTTGART, GERMANY.

APPARATUS FOR AUTOMATICALLY ADJUSTING THE SPARKING PERIOD OF IGNITION SYSTEMS.

1,105,628.        Specification of Letters Patent.        Patented Aug. 4, 1914.

Application filed March 10, 1913. Serial No. 753,217.

*To all whom it may concern:*

Be it known that I, ANTON DIEMER, a subject of the Emperor of Germany, residing at and whose post-office address is Lerchenstrasse 77, Stuttgart, Germany, have invented certain new and useful Improvements in Apparatus for Automatically Adjusting the Sparking Period of Ignition Systems; and I do hereby declare the following to be a full, clear, and exact description of the invention, such as will enable others skilled in the art to which it appertains to make and use the same.

The present invention relates to electrical ignition apparatus and particularly to apparatus for automatically varying the angular relation between the driving and driven elements in accordance with the speed of an associated internal combustion engine in order to automatically vary the sparking period of the ignition system relatively to the stroke of the engine. For this purpose the rotatable driving and driven elements are displaced angularly relatively to each other in direct opposition to circumferentially disposed springs, and this angular displacement is brought about by radially movable members subjected to centrifugal action and arranged in such manner that they may coöperate to totalize their individual angular displacements, or the amounts of their separating force, or both.

In the preferred embodiment within my invention, the driving and driven elements are each symmetrically arranged relatively to the axis of rotation, and each is provided with bearing surfaces which advance circumferentially with increasing radial distance from the axis of rotation and which are coöperative with oppositely directed but similarly shaped bearing surfaces on another element. Furthermore rotatable intermediate members are symmetrically interposed between the driving and driven elements and they have bearing surfaces which advance circumferentially like the bearing surfaces of the adjacent elements, but in the opposite direction thereto, so that the radially movable members acting between the adjacent bearing surfaces gradually advance the driven member relatively to the driving member through an accumulative angular displacement and by an accumulative separating force as the centrifugal action increases in response to an increase in the engine speed. The pressure springs are circumferentially disposed so as to directly oppose the circumferential displacing force of the radially movable members and directly resist the circumferential advance of the driven member, whereby the relatively movable parts of the apparatus are continually held under pressure so as to substantially prevent chattering and consequent wearing during the recurring fluctuations of the driving torque of a magneto, for example, such fluctuations usually occurring most at low speed as a result of the variable nature of the magnetic attraction between the field mangets and the shuttle armature thereof. Preferably, these springs are arranged symmetrically, and act in a circumferential direction directly between the driving and driven elements. In this way, the rotating parts of the adjusting apparatus are symmetrically disposed about the axis of rotation, and are therefore mechanically balanced at all positions, so that the uniform operation is not disturbed thereby at any time.

The apparatus of my invention may be installed in various places in an electrical ignition system, as between the engine and the ignition machine to simultaneously vary the angular position of the machine and the associated mechanical interrupter relatively to the stroke of the engine, or it may be located between the ignition machine and the mechanical interrupter to angularly displace the interrupter independently of the machine.

In the accompanying drawings, illustrating this preferred embodiment of my invention and several modifications thereof in application to a magneto as an example, Figure 1 represents a section on line 1—1 of Fig. 2; Fig. 2 represents a plan view of a modification the apparatus having two pairs of driving and driven elements; Fig. 3 represents a section similar to Fig. 1 of a modification having three pairs of driving and driven elements; Fig. 4 represents a section on line 4—4 of Fig. 5; Fig. 5 represents a plan view similar to Fig. 2 of a modification having an intermediate member between the driving and driven elements; Fig. 6 represents a section similar to Fig. 1 of a modification having two intermediate members; and Fig. 7 represents a section on line 7—7 of Fig. 6.

In the drawings, the disk $a$ is connected by a suitable coupling $r$ or the like to a shaft $s$ which is driven from the shaft of an associated internal combustion engine in the cylinders of which the combustible mixtures are ignited in proper order by sparks produced at spark plugs therein by ignition voltages generated in the rotating armature $t$ of the magneto in the well known way. The driving member $a$ is loosely mounted on the end of the armature shaft $d$ and is provided with driving elements $b$ which are symmetrically-disposed relatively to the axis of rotation, there being two of such elements spaced approximately 180° apart in Figs. 1, 2, 4, 5 and 6, and three of such elements spaced approximately 120° apart in Fig. 3. In all the modifications the bearing surfaces $b'$ of these elements advance circumferentially in the same direction with increasing radial distance from the axis of rotation, and preferably have the form of a concave wedge surface as shown. The driven member $e$, likewise in the form of a disk, is fastened on the shaft $d$ at a sufficient axial distance from the disk $a$ to clear the driving elements $b$, and it is provided with the symmetrically-disposed driven elements $c$ equal in number in each case to the number of driving elements $b$, but having their bearing surfaces circumferentially advanced in the opposite direction thereto. The adjacent driving and driven elements are held apart by the circumferentially arranged pressure springs $i$ which set in the recesses $h$ in the elements on the faces $m$ away from their bearing surfaces.

In the modifications shown in Figs. 1, 2 and 3, a roller $g$ is interposed between the coöperative bearing surfaces $b'$ and $c'$ of each pair of driving and driven elements, so that when the shaft $s$ is driven by the engine the rollers $g$ move radially outward between the bearing surfaces in response to centrifugal action, and thereby advance the driven member $e$ relatively to the driving member $c$ against the pressure of the springs $i$ in accordance with the speed of the engine. In these cases the displacing force effective on the driven member is accumulative, while the angle through which the driven member is displaced relatively to the driving member is twice the effective circumferential advance of each bearing surface.

In the modification shown in Figs. 4 and 5, a symmetrical intermediate member $f$ is loosely supported for free rotation on the shaft $d$, and is provided with oppositely directed bearing surfaces $f'$ on each side of the shaft and of substantially similar shape as the coöperative bearing surfaces $b'$ and $c'$ of the driving and driven elements. After a certain speed of the engine is exceeded, the rollers $g$ move radially outward and accumulatively advance the angular position of the driven member relatively to the driving member. Thus if the effective circumferential advance of each bearing surface $b'$, $c'$ and $f'$ is five degrees, then the total angular advance of the driven member $e$ relatively to the driving member $a$ is 20°. Furthermore, the force separating the driving and driven members is twice that produced by each roller. Upon reduction of speed of the engine the same results occur in the opposite direction.

There are two intermediate members $f$ shown in Figs. 6 and 7 and six rollers $g$ are employed between the coöperative bearing surfaces $b'$, $c'$ and $f'$, so that an effective circumferential advance of 5° of each bearing surface produces a total displacement of 30° of the driven member relatively to the driving member, while the force of angular displacement is twice that effected by each roller. The intermediate members $f$ are symmetrically disposed so as to effect a mechanical balance in all positions of rotation, and the members $f$ are constructed, as shown in Fig. 7, in such manner that their bearing surfaces lie in substantially the same plane. The rollers $g$ herein shown, and also the intermediate members $f$, when such members are employed, are maintained by the springs $i$ in constant engagement with the driven elements as well as with the driving elements, even when the driving torque required by the magneto armature varies considerably throughout each rotation, thereby reducing chattering and wear of the parts. However, the wear which does result after continued operation has but little influence on the positiveness of connection between the driving and driven members in the arrangements shown. The circumferential arrangement of the springs $i$ shown in the drawings permits the use of simple pressure springs between the driving and driven elements so that they act directly in opposition to the angular advance of the driven member.

Having thus described my invention, what I claim is:—

1. In apparatus for automatically adjusting the sparking period of an ignition system relatively to the stroke of an internal combustion engine associated therewith, a rotatable driving element having a bearing surface, a rotatable driven element having a bearing surface, a displacing member adapted to move radially outward between the bearing surfaces in response to centrifugal action and thereby exert a circumferential displacing force to vary the angular relation between the driving and driven elements, and a circumferentially-disposed spring adapted to directly oppose said displacing force; substantially as described.

2. In apparatus for automatically adjusting the sparking period of an ignition system relatively to the stroke of an internal combustion engine associated therewith, a rotatable driving element having symmetrically-disposed bearing surfaces, a rotatable driven element having bearing surfaces, displacing members adapted to move radially outward between the bearing surfaces in response to centrifugal action and thereby exert a circumferential displacing force to vary the angular relation between the driving and driven elements in accordance with the speed of the engine, and circumferentially-disposed springs adapted to directly oppose said displacing force; substantially as described.

3. In apparatus for automatically adjusting the sparking period of an ignition system relatively to the stroke of an internal combustion engine associated therewith, a rotatable driving element having symmetrically-disposed bearing surfaces, a rotatable driven element having symmetrically disposed bearing surfaces, displacing members adapted to move radially outward between the bearing surfaces in response to centrifugal action and thereby exert a circumferential displacing force to vary the angular relation between the driving and driven elements in accordance with the speed of the engine, and circumferentially-disposed springs adapted to directly oppose said displacing force; substantially as described.

4. In apparatus for automatically adjusting the sparking period of an ignition system relatively to the stroke of an internal combustion engine associated therewith, a rotatable driving element having symmetrically-disposed bearing surfaces, a rotatable driven element having symmetrically disposed bearing surfaces, displacing members adapted to move radially outward between the bearing surfaces in response to centrifugal action and thereby exert a circumferential displacing force to vary the angular relation between the driving and driven elements in accordance with the speed of the engine, and symmetrically-arranged circumferentially-disposed springs arranged between the elements to directly oppose said displacing force; substantially as described.

5. In apparatus for automatically adjusting the sparking period of an ignition system relatively to the stroke of an internal combustion engine associated therewith, a rotatable driving element having bearing surfaces which advance circumferentially with increasing radial distance from the axis of rotation, a rotatable driven element having bearing surfaces, displacing members adapted to move radially outward between the bearing surfaces in response to centrifugal action, and thereby exert a circumferential displacing force to vary the angular relation between the driving and driven elements in accordance with the speed of the engine, and circumferentially-disposed springs adapted to directly oppose said displacing force; substantially as described.

6. In apparatus for automatically adjusting the sparking period of an ignition system relatively to the stroke of an internal combustion engine associated therewith, a rotatable driving element having bearing surfaces which advance circumferentially with increasing radial distance from the axis of rotation, a rotatable driven element having bearing surfaces which advance in the opposite circumferential direction with increasing radial distance from the axis of rotation, displacing members adapted to move radially outward between the bearing surfaces in response to centrifugal action and thereby exert a circumferential displacing force to vary the angular relation between the driving and driven elements in accordance with the speed of the engine, and circumferentially-disposed springs adapted to directly oppose said displacing force; substantially as described.

7. In apparatus for automatically adjusting the sparking period of an ignition system relatively to the stroke of an internal combustion engine associated therewith, a rotatable driving element having symmetrically-disposed bearing surfaces which advance circumferentially with increasing radial distance from the axis of rotation, a rotatable driven element having bearing surfaces, displacing members adapted to move radially outward between the bearing surfaces in response to centrifugal action and thereby exert a circumferential displacing force to vary the angular relation between the driving and driven elements in accordance with the speed of the engine, and circumferentially-disposed springs adapted to directly oppose said displacing force; substantially as described.

8. In apparatus for automatically adjusting the sparking period of an ignition system relatively to the stroke of an internal combustion engine associated therewith, a rotatable driving element having symmetrically-disposed bearing surfaces which advance circumferentially with increasing radial distance from the axis of rotation, a rotatable driven element having symmetrically-disposed bearing surfaces which advance in the opposite circumferential direction with increasing radial distance from the axis of rotation, displacing members adapted to move radially outward between the bearing surfaces in response to centrifugal action and thereby exert a circumferential displacing force to vary the angular relation between the driving and driven elements in accordance with the speed of the engine, and circumferentially-disposed springs adapted to directly oppose said displacing force; substantially as described.

9. In apparatus for automatically adjusting the sparking period of an ignition system relatively to the stroke of an internal combustion engine associated therewith, a rotatable driving element having symmetrically-disposed bearing surfaces which advance circumferentially with increasing radial distance from the axis of rotation, a rotatable driven element having symmetrically-disposed bearing surfaces which advance in the opposite circumferential direction with increasing radial distance from the axis of rotation, displacing members adapted to move radially outward between the bearing surfaces in response to centrifugal action and thereby exert a circumferential displacing force to vary the angular relation between the driving and driven elements in accordance with the speed of the engine, and circumferentially-disposed springs between the elements to directly oppose said displacing force; substantially as described.

10. In apparatus for automatically adjusting the sparking period of an ignition system relatively to the stroke of an internal combustion engine associated therewith, a rotatable driving element having a bearing surface, a rotatable driven element having a bearing surface, a rotatable intermediate member having bearing surfaces coöperative with the bearing surfaces of the driving and driven elements, displacing members adapted to move radially outward between the bearing surfaces in response to centrifugal action and thereby exert a circumferential displacing force to vary the angular relation between the driving and driven elements, and a circumferentially-disposed spring adapted to directly oppose said displacing force; substantially as described.

11. In apparatus for automatically adjusting the sparking period of an ignition system relatively to the stroke of an internal combustion engine associated therewith, a rotatable driving element having symmetrically-disposed bearing surfaces, a rotatable driven element having symmetrically-disposed bearing surfaces, a rotatable intermediate member having symmetrically-disposed bearing surfaces coöperative with the bearing surfaces of the driving and driven elements, displacing members adapted to move radially outward between the coöperative bearing surfaces in response to centrifugal action and thereby exert a circumferential displacing force to vary the angular relation between the driving and driven elements in accordance with the speed of the engine, and circumferentially-disposed springs adapted to directly oppose said displacing force; substantially as described.

12. In apparatus for automatically adjusting the sparking period of an ignition system relatively to the stroke of an internal combustion engine associated therewith, a rotatable driving element having symmetrically-disposed bearing surfaces which advance circumferentially with increasing radial distance from the axis of rotation, a rotatable driven element having symmetrically-disposed bearing surfaces which advance circumferentially in the opposite direction with increasing radial distance from the axis of rotation, a rotatable intermediate member having symmetrically disposed bearing surfaces which advance circumferentially with increasing radial distance from the axis of rotation and in a direction opposite to that of the adjacent bearing surfaces of the driving and driven elements, displacing members adapted to move radially outward between the coöperative bearing surfaces in response to centrifugal action and thereby exert a circumferential displacing force to vary the angular relation between the driving and driven elements in accordance with the speed of the engine, and circumferentially-disposed springs adapted to directly oppose said displacing force; substantially as described.

13. In apparatus for automatically adjusting the sparking period of an ignition system relatively to the stroke of an internal combustion engine associated therewith, a rotatable driving element having bearing surfaces, a rotatable driven element having bearing surfaces, a plurality of rotatable intermediate members having bearing surfaces coöperative with the bearing surfaces of the driving and driven elements, displacing members adapted to move radially outward between the bearing surfaces in response to centrifugal action and thereby exert a circumferential displacing force to vary the angular relation between the driving and driven elements in accordance with the speed of the engine, and circumferentially-disposed springs adapted to directly oppose said displacing force; substantially as described.

14. In apparatus for automatically adjusting the sparking period of an ignition system relatively to the stroke of an internal combustion engine associated therewith, a rotatable driving element having symmetrically-disposed bearing surfaces which advance circumferentially with increasing radial distance from the axis of rotation, a rotatable driven element having symmetrically-disposed bearing surfaces which advance circumferentially with increasing radial distance from the axis of rotation, a plurality of intermediate members having symmetrically-disposed bearing surfaces which advance circumferentially with increasing radial distance from the axis of rotation and in the opposite direction to that of the adjacent bearing surface, displacing members adapted to move radially outward between the bearing surfaces in response to centrifugal action and thereby exert a circumferential displacing force to vary the angular relation between the driving and driven elements in accordance with the speed of the engine, and circumferentially-disposed springs interposed between the driving and driven elements to directly oppose said displacing force; substantially as described.

In testimony whereof I affix my signature, in presence of two witnesses.

ANTON DIEMER.

Witnesses:
PAUL WOLFAST,
HERMANN SCHNEIDER.